(12) United States Patent
Harris et al.

(10) Patent No.: US 8,267,682 B2
(45) Date of Patent: Sep. 18, 2012

(54) ALTERNATE POLYMER EXTRUSION SYSTEM WITH ACCUMULATOR

(76) Inventors: Holton E. Harris, Westport, CT (US); K. Burr McGhee, Westport, CT (US)

( * ) Notice: Subject to any disclaimer, the term of this patent is extended or adjusted under 35 U.S.C. 154(b) by 0 days.

(21) Appl. No.: 12/653,285

(22) Filed: Dec. 11, 2009

(65) Prior Publication Data

US 2010/0166904 A1    Jul. 1, 2010

Related U.S. Application Data

(62) Division of application No. 11/107,661, filed on Apr. 14, 2005, now abandoned.

(60) Provisional application No. 60/586,672, filed on Jul. 9, 2004.

(51) Int. Cl.
B29C 47/06 (2006.01)
B29C 47/52 (2006.01)
B29C 47/56 (2006.01)

(52) U.S. Cl. ............ 425/131.1; 425/132; 425/145; 425/205; 425/382.3; 425/462

(58) Field of Classification Search ............ 425/131.1, 425/132, 145, 205, 209, 382.3, 462
See application file for complete search history.

(56) References Cited

U.S. PATENT DOCUMENTS

| 2,680,880 A | * | 6/1954 | Corbett ............... 425/192 R |
| 5,695,789 A | | 12/1997 | Harris |
| 5,725,814 A | | 3/1998 | Harris |

OTHER PUBLICATIONS http://www.harrel.com/bobcat/index.html "The Harrel 'BOBCAT' Series of Extruders" 2 pages dated Oct. 12, 2006.

* cited by examiner

*Primary Examiner* — Yogendra Gupta
*Assistant Examiner* — Joseph Leyson
(74) *Attorney, Agent, or Firm* — Michaud-Kinney Group LLP

(57) ABSTRACT

An extrusion system and method uses an accumulator to control and use excess plastic melt. The accumulator is situated between an extruder and a gear pump. The accumulator includes an accumulator housing to store excess plastic melt from the extruder and an accumulator spring connected to an accumulator piston to subsequently send the excess plastic melt to the gear pump. In another embodiment, the accumulator includes an accumulator housing to store excess plastic melt from the extruder and a hydraulics system to send the excess plastic melt to the gear pump. The accumulator can be a first in first out (FIFO) device having a melt passage through the accumulator piston. The system and method are used particularly advantageously in Alternate Polymer extrusion installation in which gear pumps regularly increase and decrease their speed but in which the melt-supplying extruder cannot accommodate such rapid speed changes.

8 Claims, 4 Drawing Sheets

ALTERNATE POLYMER EXTRUSION SYSTEM WITH ACCUMULATOR

RELATED APPLICATIONS

This application is a divisional application of and claims priority from U.S. patent application Ser. No. 11/107,661 filed Apr. 14, 2005, now abandoned, entitled "Alternate Polymer Extrusion System and Method with Accumulator" which claims priority from U.S. provisional patent application Ser. No. 60/586,672, filed Jul. 9, 2004, entitled "Alternate Polymer Extrusion System and Method With Accumulator," and which is also incorporated herein in its entirety.

FIELD OF THE INVENTION

This invention relates to control systems and methods for plastics extruders, and more particularly to such systems and methods with an accumulator module.

BACKGROUND OF THE INVENTION

In an Alternate Polymer™ co-extrusion system, two or more extruders deliver two or more plastic melts to gear pumps connected at the output of the extruders. The outputs of the gear pumps are connected to a co-extrusion die. The gear pumps are controlled to alternately deliver more or less of their corresponding melt, requiring the gear pumps to vary their operating speed. Pressure sensors between each gear pump and its associated extruder detect any abrupt pressure differential across the gear pump. Such a pressure differential indicates that the gear pump's speed has changed, and that the extruder should change its speed to ensure proper feed of the plastic melt from the extruder to the gear pump. Alternate Polymer systems of this kind are described in the U.S. Pat. Nos. 5,725,814 and 5,695,789, issued Mar. 10, 1990 and Dec. 9, 1997, respectively in the name of Holton E. Harris and assigned to the assignee of the present invention. These two patents are incorporated herein by reference.

If an extruder can respond to a speed change in its associated gear pump, the plastic melt will flow without significant problems. However, an extruder in operation has certain inertia which resists a speed change in the extruder. Thus, large extruders have a significant amount of inertia, which prevents them from quickly adjusting to speed changes in the gear pump. Generally, in practice, an extruder can adjust to the speed changes in the gear pump where is the extruder has a relatively small diameter such as up to 1 inch or 1.5 inch diameter. However, in extrusions systems where the extruder has a larger diameter, such as, for example, in extrusion systems that produce corrugated tubing, the extruder may not be able to adjust effectively to speed changes in the gear pump. This results in the problem of having too much or too little plastic melt supplied to a gear pump from the extruder, which prevents the effective operation of the extrusion system.

BRIEF SUMMARY

In accordance with the invention an accumulator is located along the path of melt flow between the extruder output and the gear pump input.

An accumulator may be generally described as a container for storing excess plastic melt when such melt is not needed and for delivering the melt when needed. An exemplary accumulator may be spring-loaded. In such a spring-loaded accumulator, the unneeded plastic from the extrusion system enters the accumulator and pushes against a side of the container supported by a spring. Once the excess plastic is needed, the spring pushes the plastic back into the extrusion system. Therefore, the accumulator will take up excess plastic when there is excess and deliver it back when the excess is needed. The accumulator solves the problem of high extruder inertia causing a delivery of too little or too much melt to the gear pump when the gear pump changes speed. To allow the extruder and the gear pump to operate together, the accumulator accepts plastic melt from the extruder when the gear pump makes a significant reduction in speed and the accumulator then releases plastic melt to the gear pump when the gear pump increases speed.

Ordinary spring-loaded accumulators are LIFO (last in first out) devices. In other words, the last of the plastic melt that is stored in the accumulator is the first to be expelled when additional melt is required. Therefore, it is often likely that the oldest melt (which will be the last out) is left in the accumulator for a number of operations of the extrusion system. Since unused plastic is subject to degradation, the oldest melt may degrade while waiting to be returned to the melt path.

In one preferred embodiment of the invention the accumulator has a plastic melt delivery path that delivers plastic melt into an accumulator cylinder, through or past an accumulator piston and past a check valve, to a reservoir location where the plastic melt is alternately accumulated and expelled. The plastic melt delivery path through (or past) the piston is in series in the plastic melt delivery path from the extruder to the gear pump, so the first plastic melt to be delivered into the reservoir of the accumulator is the first to supplement the supply to the gear pump when the gear pump increases speed. Thus, this embodiment of the accumulator is a FIFO (first in first out) accumulator. It solves the above-noted problem of the LIFO accumulator.

In an exemplary embodiment of the invention, two or more extruders deliver two or more plastic melts to gear pumps connected at their outputs. The gear pumps are connected to a co-extrusion die in an Alternate Polymer extrusion system. To alter the plastic content in the extrudate along its length, the gear pumps are controlled to alternately deliver more or less of their corresponding melt, alternately speeding up and slowing. It should be noted that some feed forward control of the extruder may be used as is known so that the pressure change that comes from abruptly altering gear pump speed is anticipated and slowing or speeding up of the extruder is not solely in response to the sensed pressure differential. However, by placing an accumulator in each line between the extruder and the gear pump each extruder can respond more slowly than its associated gear pump. Each accumulator accepts plastic melt when the pressure at the input to the gear pump is sufficient to drive a biased piston back into a cylinder under pressure from the plastic melt. Likewise, when the gear pump rapidly comes back up to speed but the extruder lags behind, the pressure drop in the plastic melt at the input to the gear pump allows the accumulator piston to push forward previously stored melt as the extruder comes up to speed.

The above and further objects and advantages of the invention will be better understood by reference to the following detailed description of one or more preferred, exemplary embodiments taken in consideration with the accompanying drawings.

DETAILED DESCRIPTION OF PREFERRED EMBODIMENTS

Figure 1:
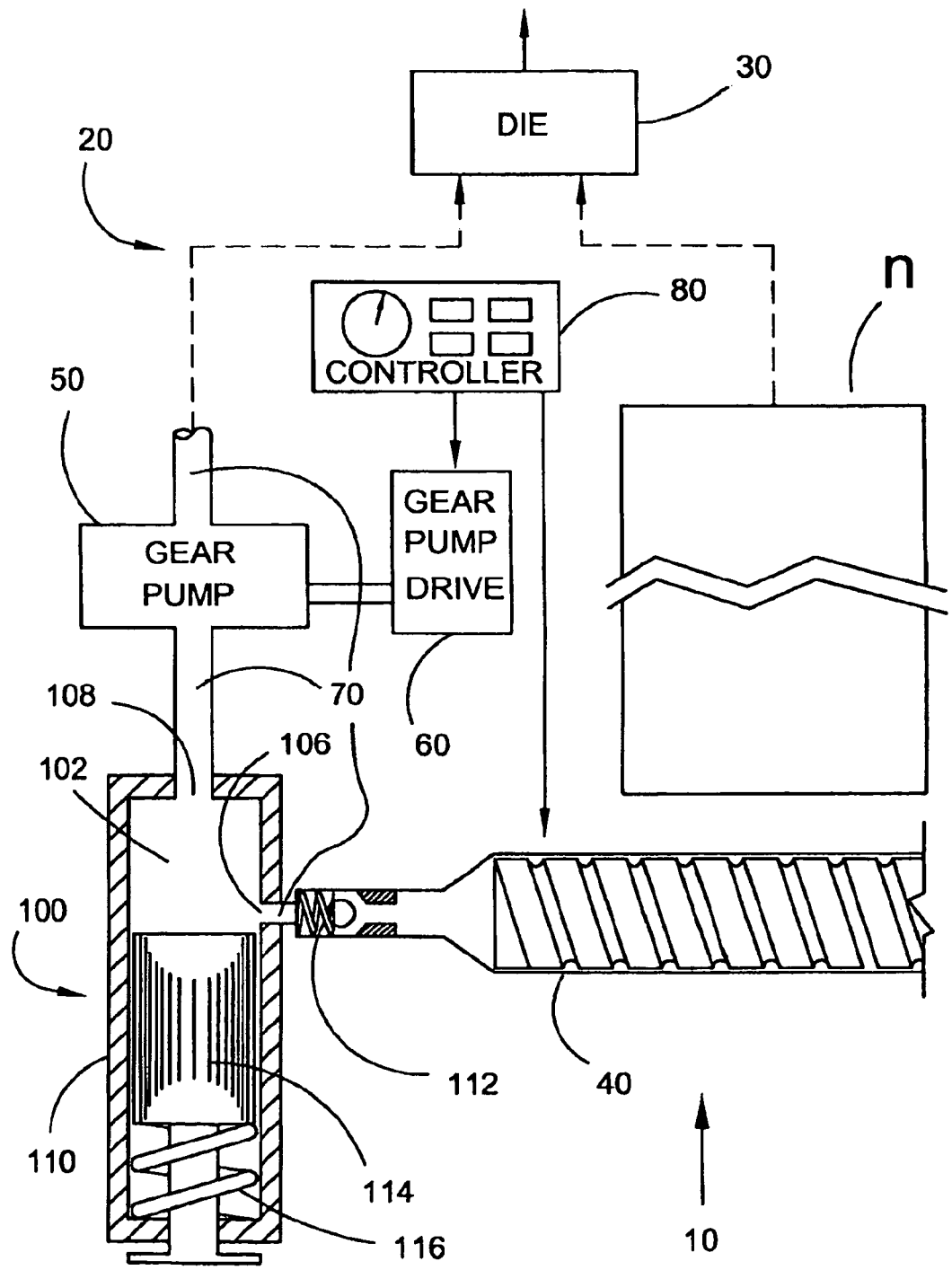
FIG. 1 is a simplified schematic illustration, in block diagram form, of an alternate polymer extrusion system with an accumulator piston in a first position in accordance with a first embodiment of the invention.

A first embodiment of an extrusion system having an accumulator is shown in FIG. 1. The extrusion system 10 includes two or more extrusion modules. The first extrusion module 20 is diagrammatically shown in greater detail and additional extrusion modules are depicted as a block n. Each of the additional extrusions modules n may be the same or similar to the first extrusion module 20. The first extrusion module 20 and each additional extrusion module 20 is connected with a co-extrusion die 30.

As shown, the first extrusion module 20 has an extruder 40, a gear pump or melt pump 50 (referred to hereafter solely as "gear pump") and a LIFO ("last in first out") accumulator 100 disposed along a melt path 70. A controller 80 is connected to and controls the extruder 40 and gear pump 50. An example of a suitable controller 80, for the purposes described herein, is the CP-873 or CP-874 Digipanel controller commercially available from Harrel, Incorporated of East Norwalk, Conn.

The extruder 40 heats plastic into a hot viscous plastic mass (called "plastic melt" or "melt") and moves the plastic downstream along the melt delivery path 70 to the left in FIG. 1. The extruder 40 may be, for example, any commercially available extrude such as the one of BOBCAT series of extruders available from Harrel, Incorporated. The controller 80 controls the speed and temperature of the extruder 40.

The gear pump 50 functions to force a precisely metered quantity of the melt through the die to form an extrudate. The gear pump 50 may increase its delivery of plastic melt by increasing speed, or reduce its delivery of plastic melt by reducing speed. Preferably, the gear pump 50 is capable of quick acceleration and deceleration when driven by its associated gear pump drive 60 (a suitable servo-motor, for example). The controller 80 controls the gear pump drive 60. The gear pump 50 may also be commercially available gear pump much as one of those offered by Harrel, Incorporated.

The accumulator 100 of the first embodiment is located along the melt delivery path 70 between the extruder 40 and the gear pump 50. The accumulator 100 includes an accumulator housing 110 defining an accumulator storing location or reservoir 102. The melt delivery path 70 continues from an input end 106 of the accumulator 100 through the accumulator melt storing location 102 and out of the accumulator housing 110 at an output end 108 of the accumulator 100. A check valve 112 is located at the input end 106. The accumulator 100 also includes an accumulator piston 114 slidable in the accumulator housing 110. The accumulator piston 114 is biased into its first position shown in FIG. 1 by a spring 116.

In operation, as illustrated in FIG. 1, with the gear pump 50 and the extruder 40 both operating, plastic melt passes from the extruder 40 along the melt delivery path 70 which extends through the accumulator 100, past the gear pump 50 and to the co-extrusion die 30.

To completely alternate the melt plastic in the extrudate emerging from the die 30, one or more of the additional extrusion modules n ramps up, the gear pump 50 comes to a halt and the extruder 40 slows. The melt moves through the accumulator 100. When the gear pump 50 slows or comes to a halt, the increase in pressure above the accumulator piston 114 forces the accumulator piston 114 down within the accumulator housing 110 to the position shown in FIG. 2.

When the gear pump 50 is restarted to deliver plastic to the co-extrusion die 30, the accumulator piston 114, biased by the spring 116, pushes excess melt located in the melt storing location 102 upward toward the gear pump 50 as a result of pressure above the accumulator piston 114 being relieved by the start, or by the increase in speed, of the gear pump 50. The check valve 112 stays seated in the input end 106, so upward movement of the accumulator piston 114 forces the accumulated plastic above the accumulator piston 114 to the gear pump 50, exhausting that stored supply of melt before fresh melt from the extruder 40 passes through the accumulator piston 114 to the gear pump 50, ending with the elements of the first extrusion module 20 again in the position illustrated in FIG. 1.

Figure 2:
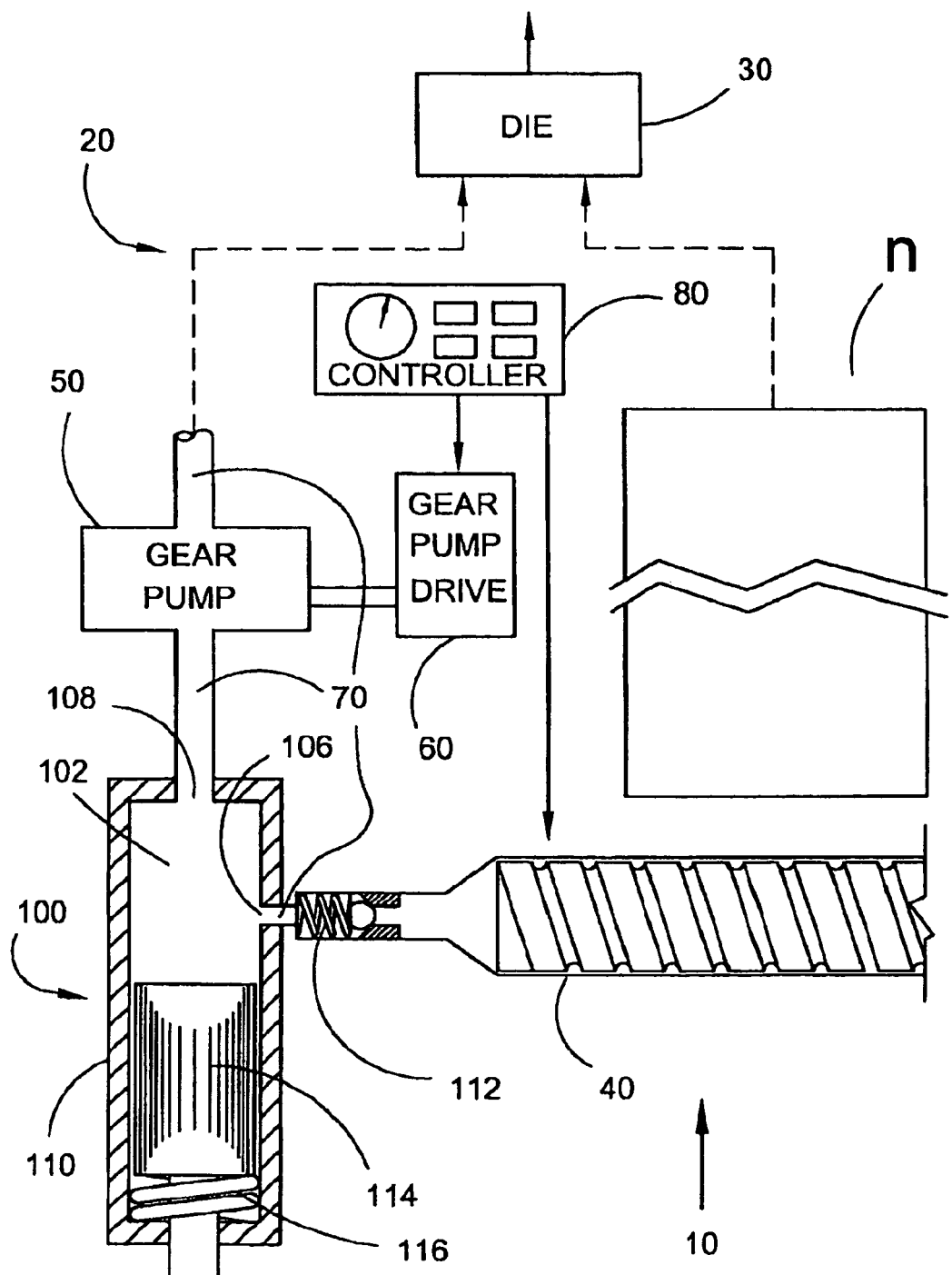
FIG. 2 is a simplified schematic illustration, in block diagram form, of the alternate polymer extrusion system like that of FIG. 1 with an accumulator piston in a second position in accordance with the first embodiment of the invention.

The foregoing explanation of operation of the Alternate Polymer system of FIGS. 1 and 2 is directed to operation of the system to change entirely from one plastic to another, by completely stopping and starting each of the gear pumps. It should be noted that a variation in relative content or ratio of the two plastics along the length of the extrudate less than an entire change-over from one to the other may be desired. This invention will benefit any such arrangement as well.

Figure 3:
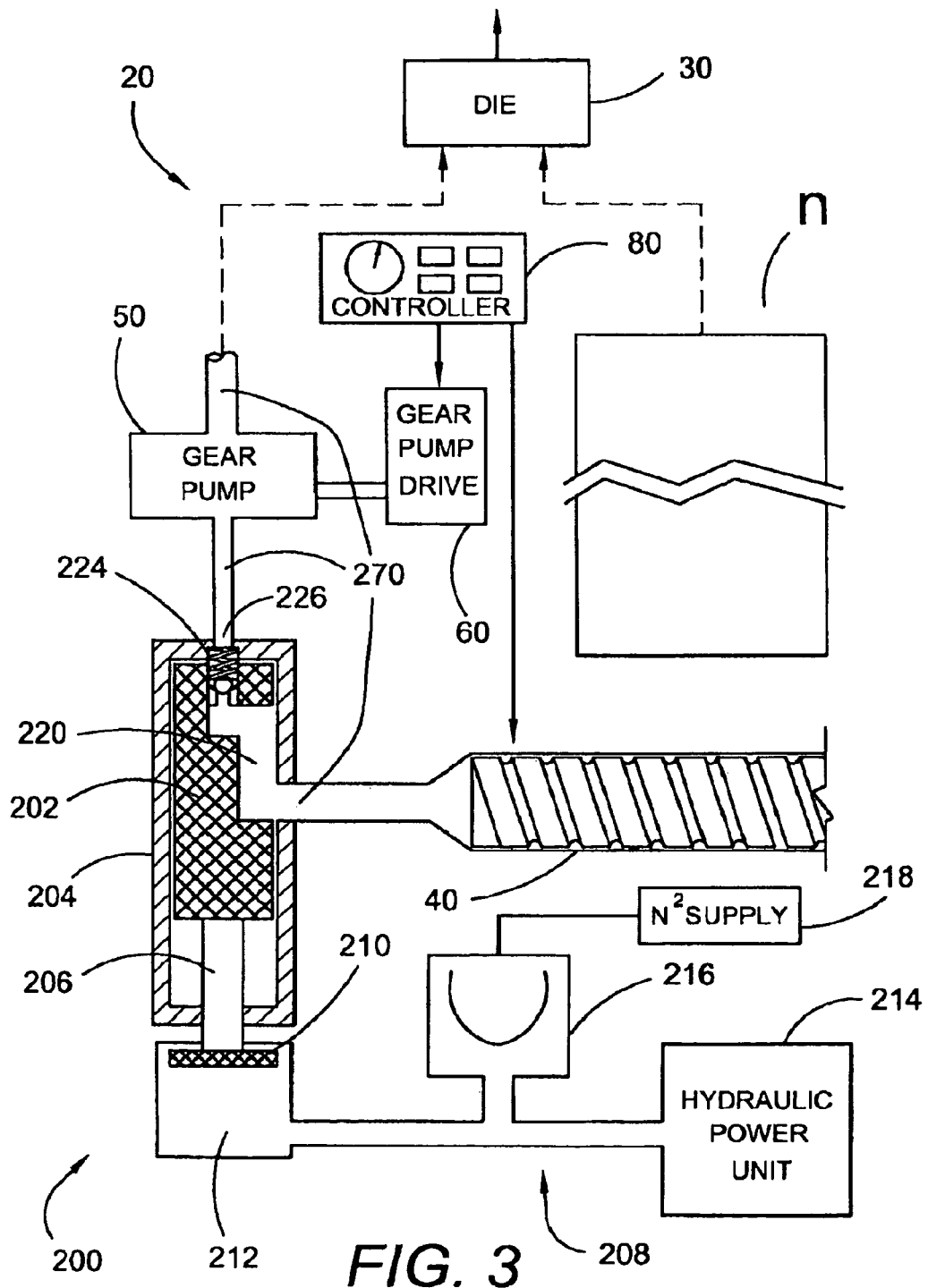
FIG. 3 is a simplified schematic illustration, in block diagram form, of the alternate polymer extrusion system of FIG. 3 with an accumulator in a first position in accordance with a second embodiment of the invention.
Figure 4:
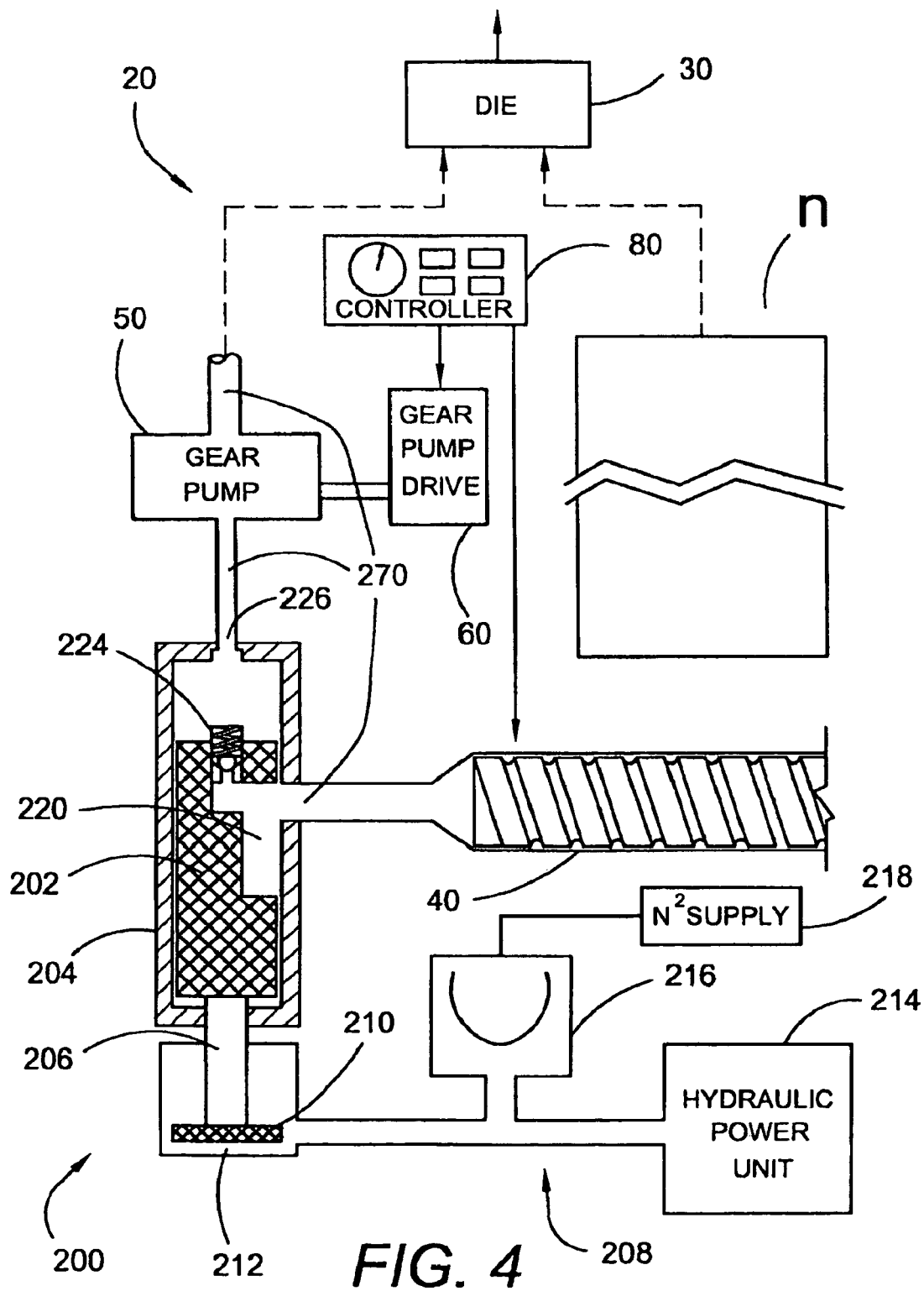
FIG. 4 is a simplified schematic illustration, in block diagram form, of the alternate polymer extrusion system of FIG. 3 with an accumulator in a second position in accordance with the second embodiment of the invention.

FIGS. 3 and 4 show a preferred embodiment using a FIFO ("first in first out") accumulator 200. The accumulator 200 has an accumulator piston 202 slidable in an accumulator housing 204. A shaft or tie rod 206 connects the accumulator piston 202 to a hydraulic system 208 that includes a hydraulic drive piston 210 in a hydraulic cylinder 212. A hydraulic power unit 214 applies pressure to oil in the hydraulic system 208. A hydraulic accumulator 216 maintains a relatively constant pressure to the oil of the hydraulic system 208 under the influence of a nitrogen supply 218 as is known.

Leading from the extruder 40 to the gear pump 50, the melt delivery path 270 of this embodiment includes a passage 220 through the accumulator piston 202 as illustrated in FIG. 3. A check valve 224 is located at an output end 226 of the passage 220.

In operation, as illustrated in FIG. 3, with the gear pump 50 and the extruder 40 both operating, plastic melt passes from the extruder 40 through the accumulator piston 202 of the accumulator 200, through the gear pump 50 to the co-extrusion die 30.

To alternate the melt plastic, one or more additional extrusion modules n ramp up, the melt pump 50 comes to a halt, and the extruder 40 slows. The plastic melt moves through the accumulator piston 202. The increase in pressure above the accumulator piston 202, caused by the stopping gear pump, forces the accumulator piston 202 down within the accumulator housing 204 to the position shown in FIG. 4. The space above the piston 202 thus accumulates the continued melt flow from the extruder 40 as that extruder slows.

The rod 206 connects the accumulator piston 202 to the hydraulic piston 210 in the cylinder 212. Thus, the accumulator piston 202 is retracted pushing oil into the hydraulic accumulator 216. The hydraulic power unit 214, in a preferred and exemplary embodiment, maintains about 800 PSI pressure in the hydraulic system 208. The hydraulic accumulator 216 is backed up with the nitrogen supply 218 that maintains the pressure on the oil in the hydraulic system 208.

When the gear pump 50 is restarted to deliver melt to the co-extrusion die 30, the oil in the hydraulic accumulator 216 pushes the hydraulic piston 210 upward in the hydraulic cylinder 212 as pressure above the accumulator piston 202 is relieved by the gear pump 50. The check valve 224 stays seated in the opening out of the passage 220 through accumulator piston 202, so upward movement of the accumulator piston 202 first forces the accumulated plastic melt above the accumulator piston 202 to the gear pump 50, exhausting that stored supply of the accumulated plastic melt before fresh melt from the extruder 40 passes through the accumulator piston 202 to the gear pump 50, ending with the elements of the first system again in the positions illustrated in FIG. 3.

Again, although the example that has been given contemplates complete stopping of the gear pumps to change the extrudate from one plastic to another, the system can be operated such that the pumps do not stop completely and the relative content of two or more plastics varies lengthwise along the extrudate.

In extrusion systems using accumulators in accordance with this invention, because pressure in the accumulator can become extremely high, it may be necessary to take steps to prevent the welding together of the accumulator piston and housing, even in the case where these are made of differing metals. In one instance this was done by increasing the clearance between the piston and housing interior surface more than one ordinarily would choose and by surface hardening the piston and housing interior surfaces by Borofuse processing. The Borofuse process is a hardening process available from Materials Development Corporation of Medford, Mass.

While one or more specific preferred embodiments have been described herein, those skilled in the art will readily recognize modifications, variations and equivalents that do not depart from the spirit and scope of the subject invention, as herein claimed.

The invention claimed is:

1. An extrusion system comprising:
   an extruder for moving plastic internally toward an end thereof;
   an accumulator, connected downstream to the extruder, for receiving plastic from the extruder, the accumulator comprising a housing and a piston within the housing;
   a gear pump, connected downstream to the accumulator, for receiving plastic from the accumulator;
   a controller being in communication with the extruder and the gear pump, the controller being operable to cause the extruder to operate in response to the operation of the gear pump; and
   a die, connected downstream to the gear pump, for receiving plastic from the gear pump and for thereafter forming the plastic into an extrudate,
   wherein the accumulator collects plastic from the extruder in response to a first operating condition of the gear pump,
   wherein the accumulator provides plastic to the gear pump in response to a second operating condition of the gear pump,
   wherein the accumulator is a first in first out accumulator, and
   wherein the path of flow of plastic from the extruder into the accumulator includes a passage through the piston to a plastic accumulation location in the accumulator.

2. The extrusion system of claim 1, wherein the first operating condition of the gear pump is a change in speed of operation of the gear pump.

3. The extrusion system of claim 1, wherein the second operating condition of the gear pump is a change in speed of operation of the gear pump.

4. The extrusion system of claim 1, wherein the piston is connected to a hydraulics system for moving the plastic within the accumulator to the gear pump.

5. The extrusion system of claim 4, wherein the extrusion system further comprises a check valve positioned between the extruder and the gear pump, wherein the check valve prevents plastic in the accumulator from flowing to the extruder while the plastic in the accumulator is being sent to the gear pump.

6. The extrusion system of claim 1, further including at least one further extruder, accumulator and gear pump, the die being a co-extrusion die connected with each of the gear pumps, whereby alternately increasing and decreasing the speeds of the gear pumps alters the relative content of plastic delivered via the co-extrusion die to the extrudate by the gear pumps.

7. The extrusion system of claim 1, further comprising a check valve located in the passage to prevent plastic flowing from the accumulation location back to the extruder.

8. An extrusion system comprising:
   an extruder for moving plastic internally toward an end thereof;
   an accumulator, connected downstream to the extruder, for receiving plastic from the extruder, the accumulator comprising a housing, a piston within the housing, and the path of flow of plastic from the extruder into the accumulator including a passage through the piston to a plastic accumulation location in the accumulator;
   a gear pump, connected downstream to the accumulator, for receiving plastic from the accumulator; and
   a die, connected downstream to the gear pump, for receiving plastic from the gear pump and for thereafter forming the plastic into an extrudate,
   wherein the accumulator collects plastic from the extruder in response to a first operating condition of the gear pump,
   wherein the accumulator provides plastic to the gear pump in response to a second operating condition of the gear pump, and
   wherein the accumulator is a first in first out accumulator.

* * * * *